US012570097B2

(12) United States Patent
Bei et al.

(10) Patent No.: US 12,570,097 B2
(45) Date of Patent: Mar. 10, 2026

(54) PRINTER

(71) Applicant: Procolored Technology Inc, Pico Rivera (CA)

(72) Inventors: Yinghong Bei, Shenzhen (CN); Jiangyu Wu, Shenzhen (CN)

(73) Assignee: Procolored Technology Inc, Pico Rivera, CA (US)

( * ) Notice: Subject to any disclaimer, the term of this patent is extended or adjusted under 35 U.S.C. 154(b) by 160 days.

(21) Appl. No.: 18/466,408

(22) Filed: Sep. 13, 2023

(65) Prior Publication Data

US 2023/0415501 A1 Dec. 28, 2023

(51) Int. Cl.

| | |
|---|---|
| ***B41J 15/04*** | (2006.01) |
| ***B41J 15/18*** | (2006.01) |
| ***B41J 15/20*** | (2006.01) |
| ***B41J 15/22*** | (2006.01) |
| *B41J 3/407* | (2006.01) |

(52) U.S. Cl.
CPC ............... *B41J 15/04* (2013.01); *B41J 15/18* (2013.01); *B41J 15/20* (2013.01); *B41J 15/22* (2013.01); *B41J 3/4075* (2013.01)

(58) Field of Classification Search
CPC ... B41J 15/04; B41J 15/18; B41J 15/20; B41J 15/22; B41J 3/4075
See application file for complete search history.

(56) References Cited

U.S. PATENT DOCUMENTS

2007/0204961 A1* 9/2007 Nakashima .......... B41J 11/0015 156/60
2017/0087903 A1* 3/2017 Yamabe ..................... B41J 2/01
2022/0236678 A1* 7/2022 Numata ............... G03G 15/101

FOREIGN PATENT DOCUMENTS

CN 102328767 A * 1/2012 ............... B65C 9/08
CN 107323108 A 11/2017
CN 209667564 U 11/2019
CN 213675917 U 7/2021
CN 215551994 U 1/2022
CN 215944067 U * 3/2022 ............. B41J 3/407
CN 114347684 A 4/2022
JP 2011156683 A 8/2011

* cited by examiner

*Primary Examiner* — Henok D Legesse

(57) ABSTRACT

A roll-to-roll printer includes a first holding mechanism for rotatably supporting a substrate stored in a rolled form, a second holding mechanism provided above the first holding mechanism, a printing mechanism provided in front of the first holding mechanism, a third holding mechanism, and a carrying mechanism. The printing mechanism is provided with a printing platform on which a printed substrate with the protective film peeled is held. The substrate is continuously transferred across the printing platform from the first holding mechanism to the front of the printing platform. The third holding mechanism is in front of the printing platform, and can rotatably support a transfer film. The carrying mechanism is in front of the printing platform to continuously carry the transfer film and the substrate, where the transfer film adheres to a printed surface of the substrate.

11 Claims, 8 Drawing Sheets

PRINTER

TECHNICAL FIELD

This application relates to a printer, and more particularly to a roll-to-roll printer.

BACKGROUND

Ultraviolet LED Inkjet Printer (UV printer) is a plate-making-free full-color digital printer. UV printers can perform color photo-quality prints on the surface of T-shirts, glass, plates, or films or other substrates, irrespective of the material. UV printers can also produce UV transfer stickers (e.g., crystal labels). Specifically, UV printers print the desired graphics on substrates of release materials to form crystal labels.

Generally, the crystal labels are usually printed in the following way. First, a substrate in the shape of A4 or A5 paper is placed on a printing platform to print the crystal label, and the substrate is taken away after the printing is completed. After printing, the substrate is transferred. The substrate is covered with a transfer film to form the complete crystal label. In use, the transfer film is peeled off and used to move the crystal label to stick the surface of the desired product.

Therefore, when using the existing UV printers to produce crystal labels, the operator needs frequent operation, resulting in low efficiency.

SUMMARY

In view of the deficiencies in the prior art, this application provides a roll-to-roll printer to increase the degree of automation and improve efficiency.

Technical solutions of this application are described as follows.

In a first aspect, this application provides a roll-to-roll printer, including:

a first holding mechanism;

a second holding mechanism;

a printing mechanism;

a third holding mechanism; and a carrying mechanism;

wherein the first holding mechanism is configured to rotatably support a substrate stored in a rolled form;

the second holding mechanism is provided above the first holding mechanism, and is configured to continuously collect a protective film which is peeled off from a surface of the substrate;

the printing mechanism is provided in front of the first holding mechanism; the printing mechanism is provided with a printing platform; the printing platform is configured to hold the substrate with the protective film peeled off; and the substrate is configured to be continuously transferred across the printing platform from the first holding mechanism toward a front of the printing platform;

the third holding mechanism is provided in front of the printing platform, and is configured to rotatably support a transfer film stored in a rolled form; and the carrying mechanism is provided in front of the printing platform, and is configured to attach the transfer film to a printed surface of the substrate to continuously carry the transfer film and the substrate.

The printer provided in the disclosure increases automation and improves efficiency.

In an embodiment, the carrying mechanism is provided with a first clamping roller and a second clamping roller opposite to each other; at least one of the first clamping roller and the second clamping roller is configured to be driven by a drive device to rotate; and the first clamping roller and the second clamping roller are configured to hold the transfer film transferred from the third holding mechanism and a printed substrate.

In an embodiment, the roll-to-roll printer further includes: a main switching portion;

wherein the main switching portion is connected to the second clamping roller to allow the second clamping roller to approach or be away from the first clamping roller.

In an embodiment, the main switching portion includes a first lever member and a handle; and a first end of the first lever member is connected to a first axial end of the second clamping roller; and the handle is configured to swingably abut against a second end of the first lever member.

In an embodiment, the roll-to-roll printer further includes: an auxiliary switching portion;

wherein the auxiliary switching portion includes a second lever member and a cam member;

a first end of the second lever member is connected to a second axial end of the second clamping roller; and the cam member is configured to swingably abut against a second end of the second lever member.

In an embodiment, the roll-to-roll printer further includes: a temperature sensor;

wherein the second clamping roller is provided with an accommodating hole extending in an axial direction of the second clamping roller; and the accommodating hole is configured to accommodate a heating member; and the temperature sensor is configured for detecting an outer peripheral temperature of the second clamping roller.

In an embodiment, the second holding mechanism includes a driving member and a rotary shaft; the driving member is connected to the rotary shaft to drive the rotary shaft to rotate so that the protective film peeled off from the surface of the substrate is wound on the rotary shaft.

In an embodiment, the roll-to-roll printer further includes: a guide roller unit;

wherein the guide roller unit is configured to guide the protective film peeled off from the surface of the substrate to the rotary shaft;

the guide roller unit includes a first guide roller and a second guide roller opposite to each other in a vertical direction; and the first guide roller and the second guide roller are provided between the first holding mechanism and the printing mechanism in a front-rear direction;

the substrate with the protective film attached thereto is configured to pass between the first guide roller and the second guide roller; and the protective film is configured to be peeled off from the surface of the substrate in front of the first guide roller and the second guide roller.

In an embodiment, the roll-to-roll printer further includes: a detecting mechanism;

wherein the detecting mechanism is configured for detecting the number of the protective film which is peeled from the surface of the substrate to be stored on the rotary shaft.

In an embodiment, the detecting mechanism includes a pressing member and a detector;

the pressing member is configured to abut against the protective film peeled from the surface of the substrate to be stored on the rotary shaft from above, and press the protective film downward with an increase of the number of the protective film; and the detector is configured to detect the protective film pressed downward by the pressing member.

DETAILED DESCRIPTION OF EMBODIMENTS

The disclosure will be described in detail below in conjunction with the accompanying drawings and embodiments to facilitate the full and clear understanding of the objects, features and advantages of the present disclosure. Described below are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

As used herein, the orientation or positional relationship indicated by the terms "upper", "lower", "front", "rear", "left", "right", etc. is based on the orientation or positional relationship shown in the accompanying drawings, which is only for the convenience of describing the technical solutions and simplifying the description, rather than indicating or implying that the indicated device or element must have a specific orientation, be constructed or operated in a specific orientation. Therefore, these terms should not be understood as a limitation of the present disclosure.

As used herein, unless otherwise expressly specified and defined, terms, such as "disposed", "fix", "connect", and "mount", should be understood in a broad sense, it may be direct connection or indirect connection. As used herein, the term "a number of" means more than one, and the term "a plurality of" means more than two. The terms "greater than", "less", or "more than", shall mean not including this number. The terms "above", "below", or "within" shall mean including this number. In addition, the terms "first" and "second" are merely descriptive, and cannot be understood as indicating or implying relative importance.

Figure 1:
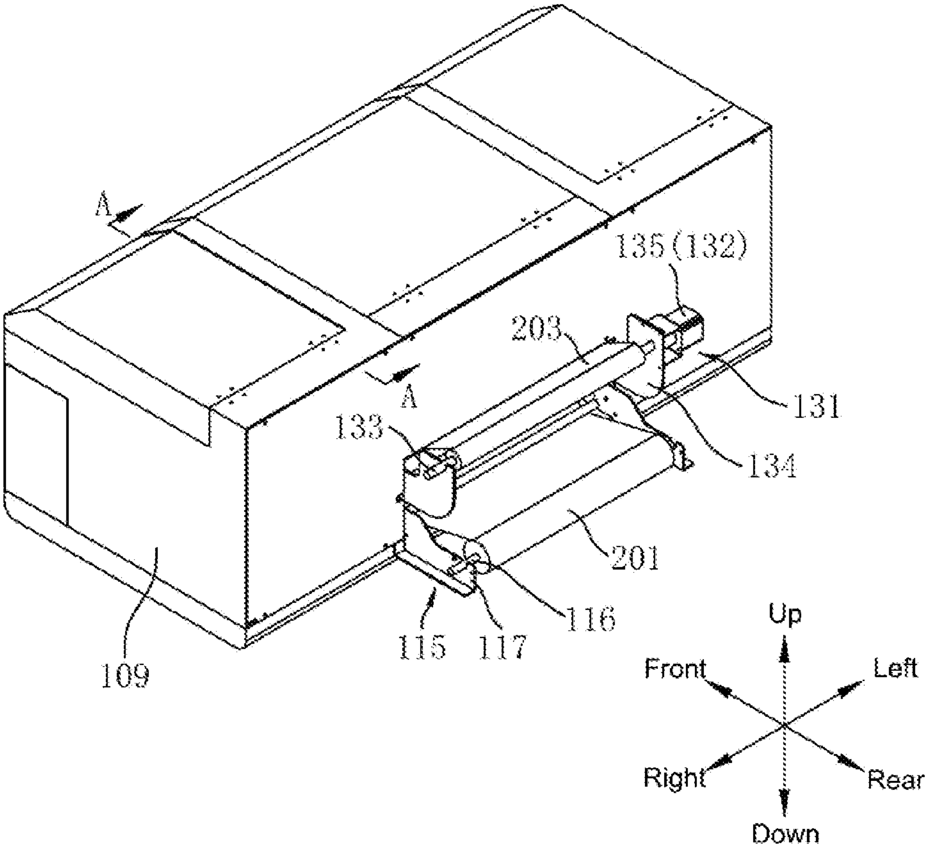
FIG. 1 is a perspective view of a roll-to-roll printer according to one embodiment of the present disclosure from the rear.
Figure 2:
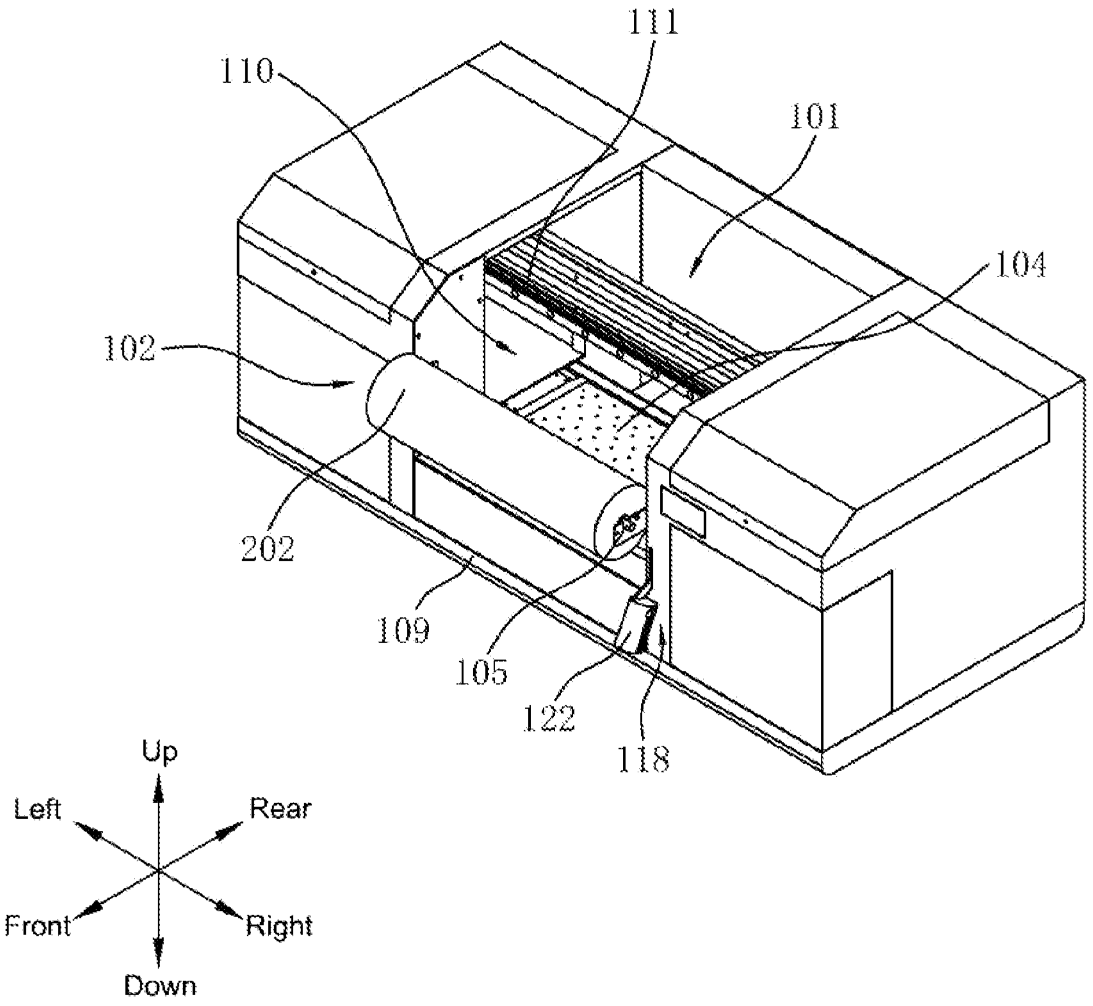
FIG. 2 is a perspective view of the roll-to-roll printer according to one embodiment of the present disclosure from the front.
Figure 3:
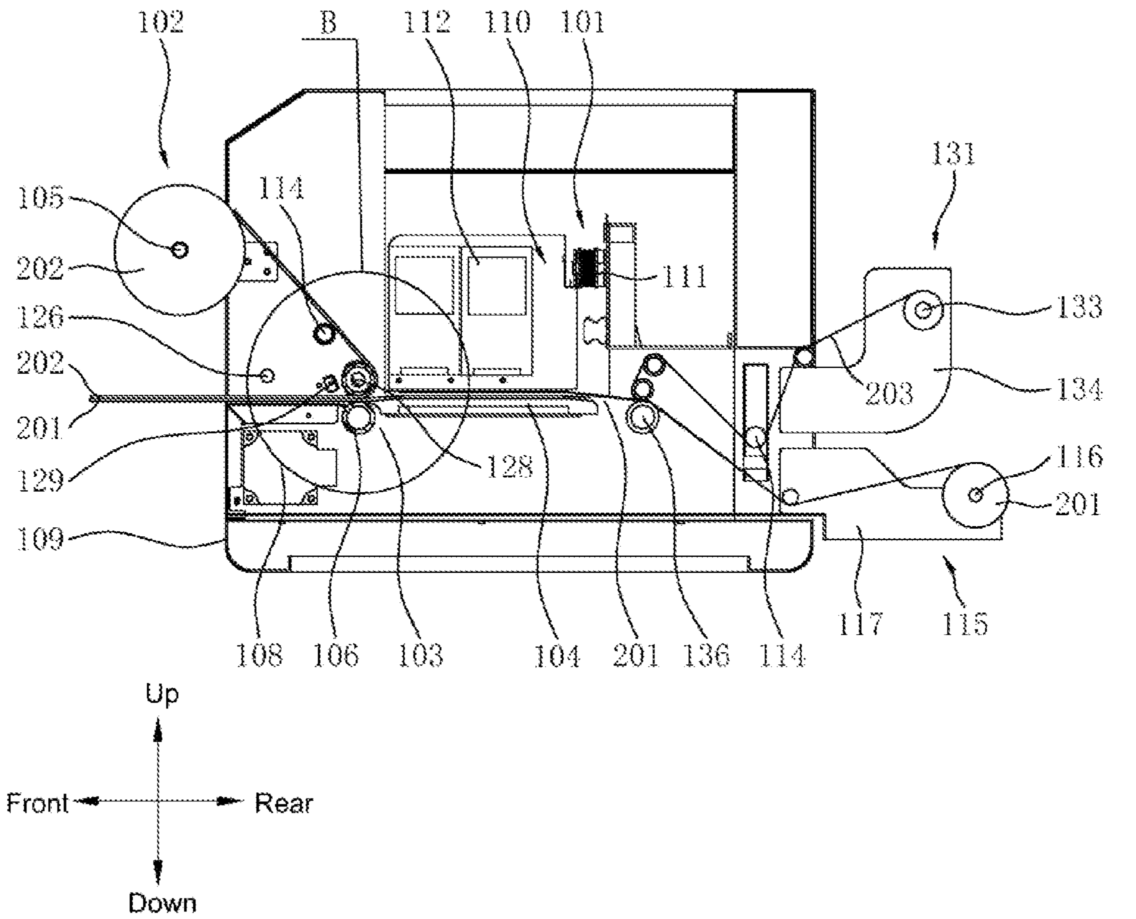
FIG. 3 is a sectional view of the roll-to-roll printer along A-A of FIG. 1.
Figure 4:
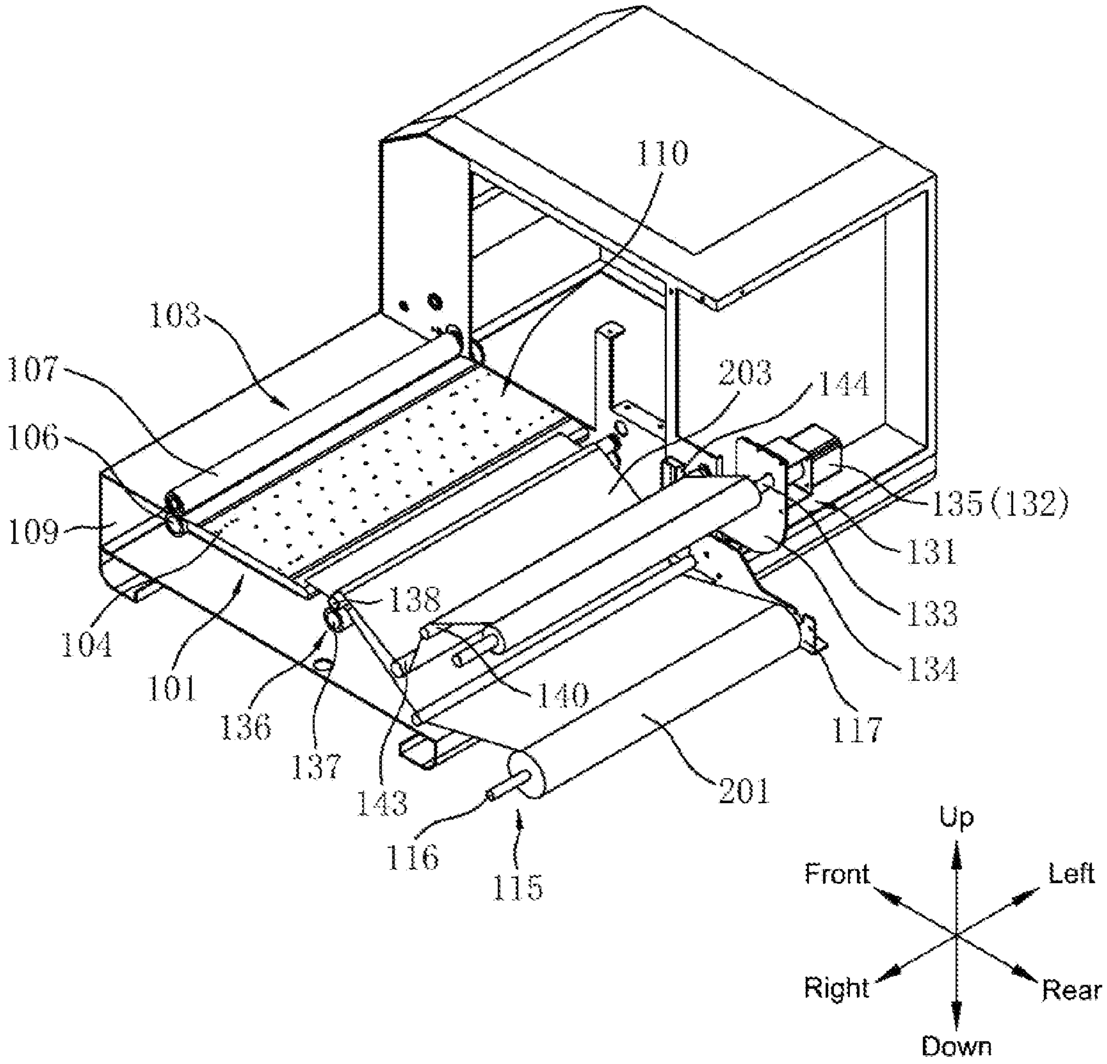
FIG. 4 is a perspective view of an internal structure of the roll-to-roll printer in FIG. 1.
Figure 5:
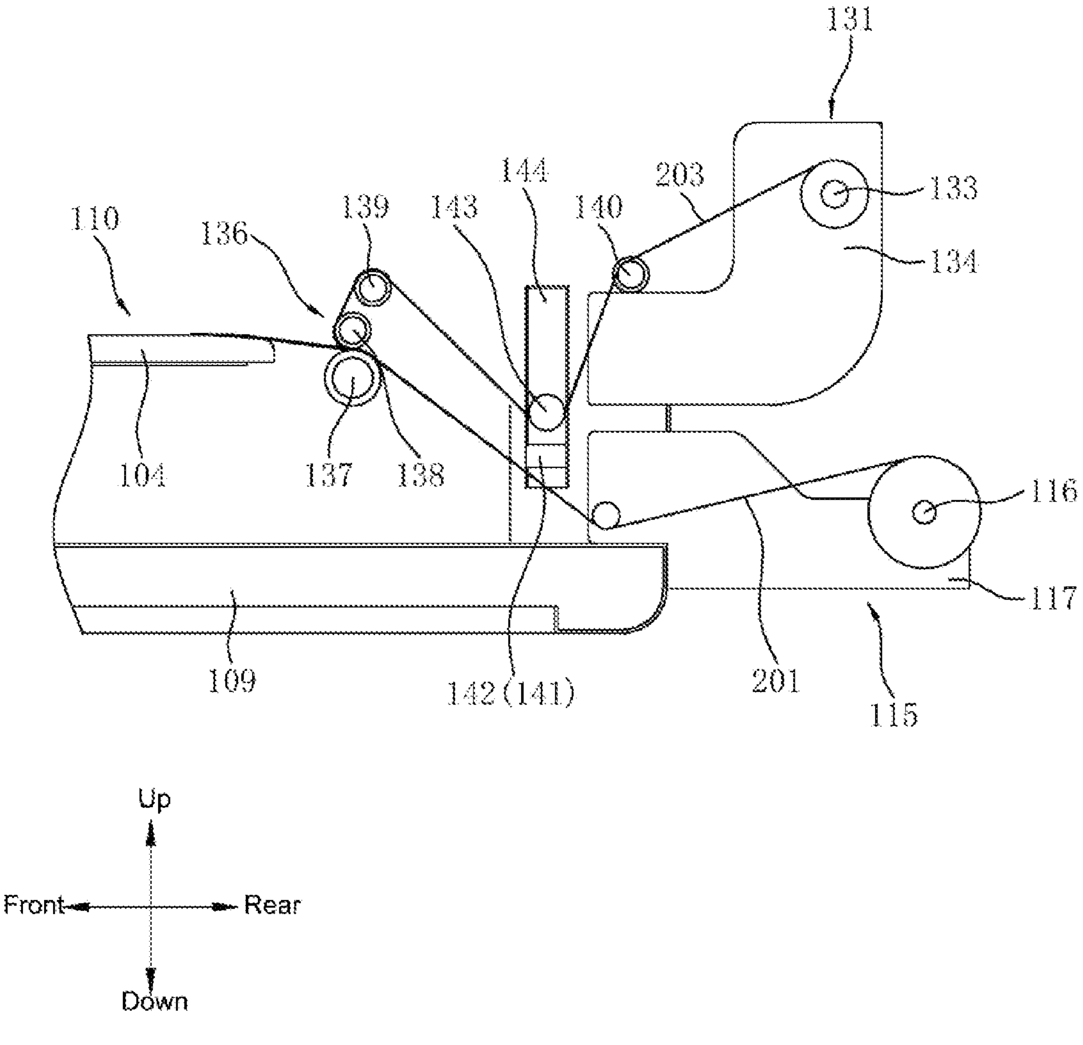
FIG. 5 schematically shows a structure of a rear half part in FIG. 3.
Figure 6:
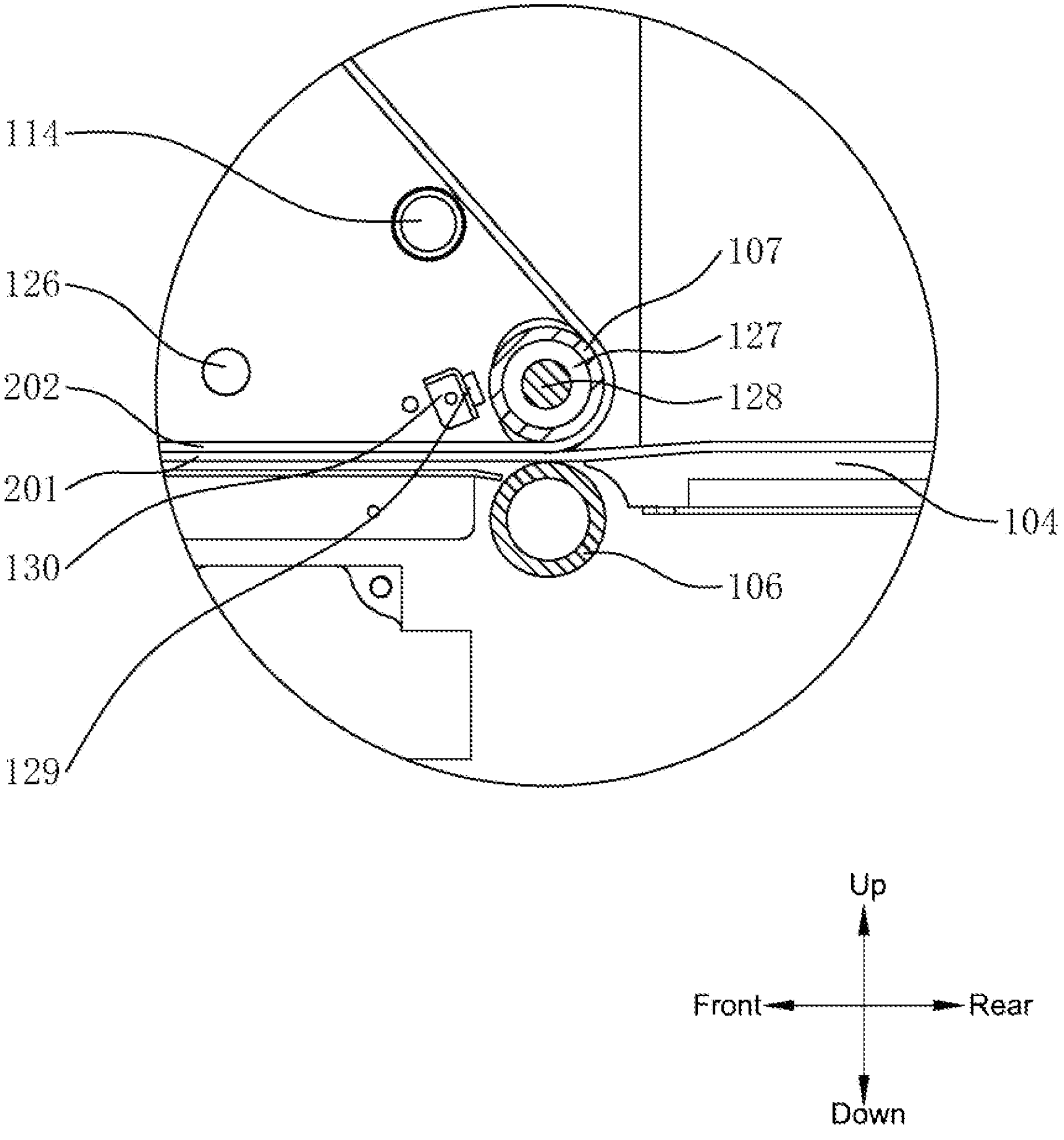
FIG. 6 is a partially enlarged view of portion "B" in FIG. 3.
Figure 7:
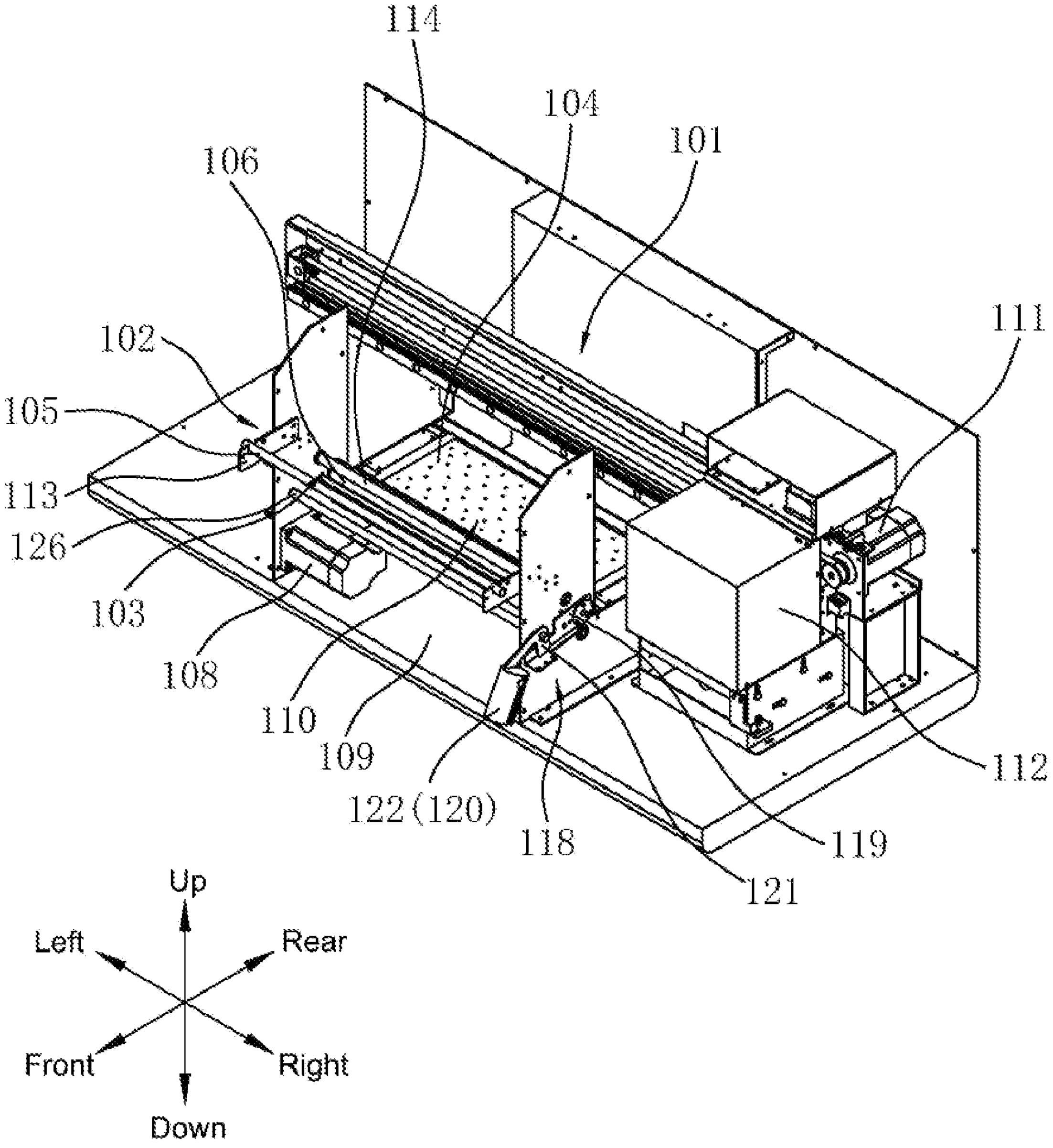
FIG. 7 is a perspective view of an internal structure of the roll-to-roll printer in FIG. 1 from the right.
Figure 8:
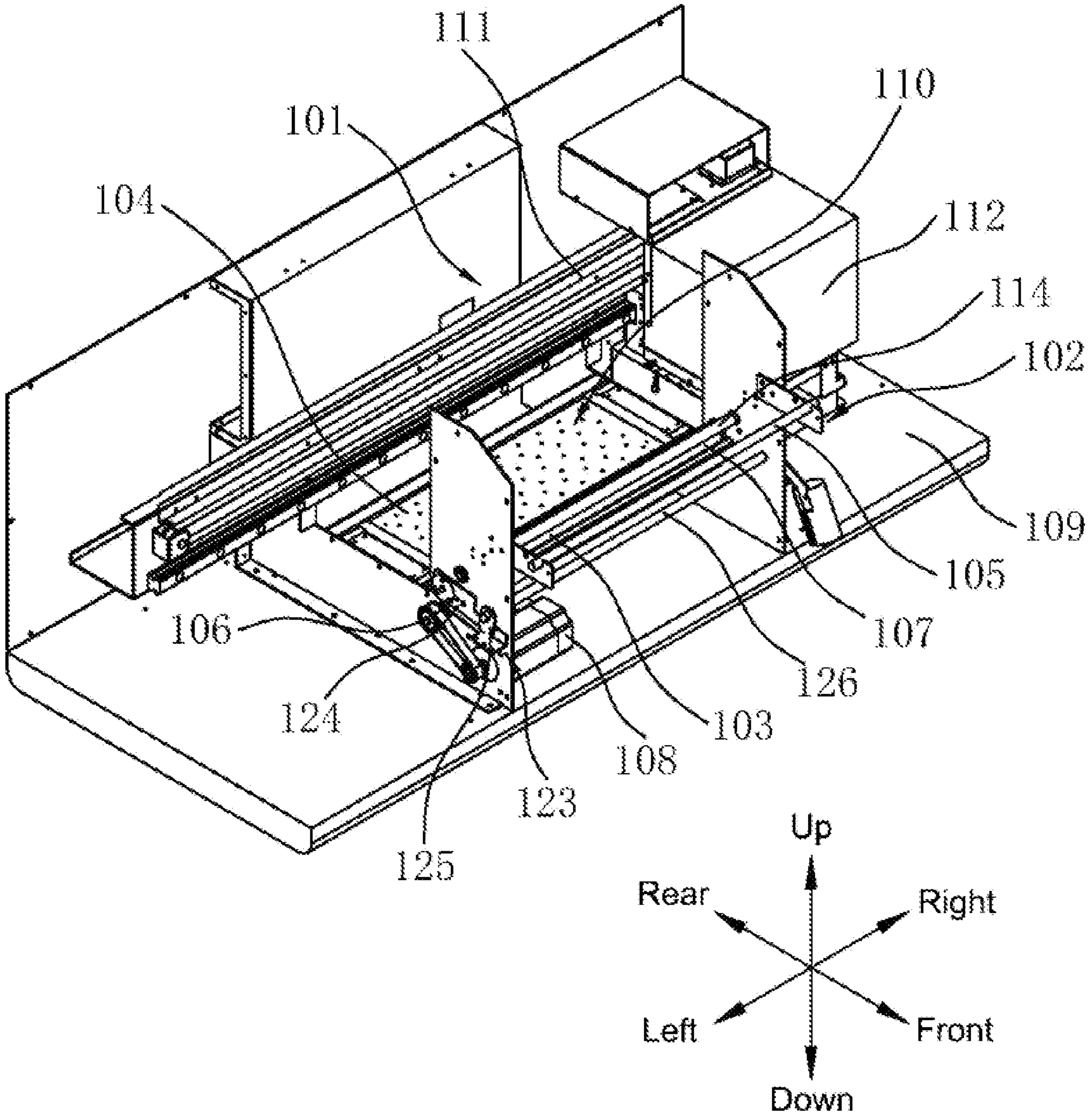
FIG. 8 is a perspective view of the internal structure of the printer in FIG. 1 from the left.

FIG. 1 is a perspective view of a roll-to-roll printer from the rear. FIG. 2 is a perspective view of the printer from the front. FIG. 3 is a sectional view of the roll-to-roll printer along A-A of FIG. 1, in which sectional lines are not added to some parts for ease of display. FIG. 4 is a perspective view of some main parts of the internal structure of the roll-to-roll printer in FIG. 1. FIG. 5 schematically shows a structure of a rear half part in FIG. 3. FIG. 6 is a partially enlarged view of portion "B" in FIG. 3, in which sectional lines are not added to some parts for ease of display. FIG. 7 is a perspective view of an internal structure of the roll-to-roll printer in FIG. 1 from the right. FIG. 8 is a perspective view of the internal structure of the roll-to-roll printer in FIG. 1 from the left. FIGS. 7 and 8 are schematic diagrams of the roll-to-roll printer in absence of a part of a sheet metal member of the base 109.

Referring to FIGS. 1 to 8, the roll-to-roll printer (sometimes referred to "printer" hereafter for ease of illustration) includes a first holding mechanism 115, a second holding mechanism 131, a printing mechanism 101, a third holding mechanism 102, and a carrying mechanism 103. The first holding mechanism 115 is configured to rotatably support a substrate 201 stored in a rolled form. The second holding mechanism 131 is disposed above the first holding mechanism 115, and is configured to continuously collect a protective film 203 that is peeled off from the surface of the substrate 201. The printing mechanism 101 is provided in front of the first holding mechanism 115. The printing mechanism 101 is provided with a printing platform 104. The printing platform 104 is configured to hold the substrate 201 with the protective film 203 peeled off. The substrate 201 is configured to be continuously transferred across the printing platform 104 from the first holding mechanism 115 toward the front of the printing platform 104. The third holding mechanism 102 is provided in front of the printing platform 104 and is configured to rotatably support the transfer film 202 stored in a rolled form. The carrying mechanism 103 is provided in front of the printing platform 104, and is configured to attach the transfer film 202 to the printed surface of the substrate 201 to continuously carry the transfer film 202 and the substrate 201. Specifically, the printed surface of the substrate 201 is printed with various desired patterns or characters, such as crystal labels. For the sake of convenience of illustration, it will use the crystal labels as an example.

The roll-to-roll printer provided in the disclosure can increase automation and improve efficiency.

Specifically, the printer can be applied to the substrate 201 in the rolled form, and be configured to automatically peel off the protective film 203 on the surface of the substrate 201 at least to some extent. For example, the surface of the substrate 201 is covered with the protective film 203 and held in the rolled form in the first holding mechanism 115. When mounting the substrate 201, the protective film 203 is first peeled off by an operator at the beginning end of the substrate 201. Then, the peeled protective film 203 is pulled to the second holding mechanism 131, and the substrate 201 with the protective film 203 peeled off is pulled to the carrying mechanism 103 via the printing platform 104. As a result, when the printhead 112 of the printing mechanism 101 prints the substrate 201 held in the printing platform 104, the carrying mechanism 103 pulls and transfers the substrate 201 out continuously. At the same time, since one end of the protective film 203 is pulled to the second holding mechanism 131, the second holding mechanism 131 can continuously collect the protective film 203 peeled off from the surface of the substrate 201 as the substrate 201 is transferred out, thereby reducing the workload of the operator, and improving work efficiency.

The printer is provided with the third holding mechanism 102 for supporting the transfer film 202. The printer is further provided with the carrying mechanism 103 for continuously carrying the transfer film 202 and the substrate 201 in such a manner that the transfer film 202 is attached to the surface of the substrate 201 on which the crystal label has been printed. Thus, not only can the printer print such as crystal labels on the substrate 201, but also can cover the transfer film 202 on the substrate 201.

As a result, the degree of automation of the printer is increased. The operation of peeling off the protective film 203, and printing and covering the transfer film 202 can be realized in a single operation without the frequent operation for the operator, thereby increasing efficiency and improving the consumer experience.

Referring to FIGS. 3 and 2, the printer includes the base 109, which may be formed by machining sheet metal parts into the shape of a box. The base 109 is provided with a printing region 110 in the middle of the base 109 in the left-right direction. The printing platform 104 of the printing mechanism 101 is provided in the printing region 110. The printing region 110 is open in the front-rear direction, thereby facilitating feeding of the substrate 201. The printing mechanism 101 also includes a manipulator 111 driven in the left-right direction. The printhead 112 is mounted on the manipulator 111. While the substrate 201 is continuously fed, the manipulator 111 may drive the printhead 112 to move in the left-right direction, thereby printing the desired crystal label on the substrate 201 on the printing platform 104.

Referring to FIGS. 1, 3 and 4, the first holding mechanism 115 is provided at the rear bottom of the printing platform 104. In this embodiment, to easily mount the substrate 201, the first holding mechanism 115 includes a first bracket 117 and a first support shaft 116. In this embodiment, the first bracket 117 includes a pair of brackets mounted opposite to each other in the left-right direction at the rear of the base 109, and the pair of brackets extends out from the base 109. The first support shaft 116 is detachably supported in the first bracket 117 and configured to rotatably support the substrate 201. For example, the first support shaft 116 may be inserted into a roll of the substrate 201 during installation, and then the first support shaft 116 is placed on the first bracket 117.

In this embodiment, the second holding mechanism 131 is provided at the rear top of the printing platform 104. To easily collect the protective film 203 and remove the collected protective film 203, the second holding mechanism 131 includes a second bracket 134. In this embodiment, the second bracket 134 includes a pair of brackets disposed opposite to each other in the left-right direction at the rear of the base 109, and the pair of brackets extends out from the base 109. In addition, the second bracket 134 is provided above the first bracket 117. In an embodiment, the second holding mechanism 131 includes a first driving member 132 and a rotary shaft 133. The first driving member 132 is connected to the rotary shaft 133 to drive the rotary shaft 133 to rotate so that the protective film 203, which has been peeled off from the surface of the substrate 201, is wound on the rotary shaft 133. In an embodiment, the first driving member 132 includes a stepper motor 135 which is mounted on the second bracket 134. The rotary shaft 133 is disposed on the second bracket 134 via bearings. The stepper motor 135 is connected to the rotary shaft 133, thereby driving the rotary shaft 133 to rotate. In this embodiment, the stepper motor is selected as an actuating element to drive the rotary shaft 133 to rotate for collecting the protective film 203, thereby reducing costs.

Referring to FIGS. 3-5, in an embodiment, to wind the peeled protective film 203 accurately and reliably, the printer may further include a guide roller unit 136. The guide roller unit 136 is configured to guide the protective film 203, which has been peeled off from the surface of the substrate 201, to the rotary shaft 133.

In this embodiment, the guide roller unit 136 may include a first guide roller 137 and a second guide roller 138 opposite to each other in the vertical direction. The first guide roller 137 and the second guide roller 138 are disposed between the first holding mechanism 115 and the printing mechanism 101 in the front-rear direction. The substrate 201 with the protective film 203 attached thereto is configured to pass between the first guide roller 137 and the second guide roller 138, and the protective film 203 is configured to be peeled off from the surface of the substrate 201 in front of the first guide roller 137 and the second guide roller 138. The first guide roller 137 and the second guide roller 138 are provided on the base 109. The second guide roller 138 is provided directly above the first guide roller 137. The first guide roller 137 and the second guide roller 138 hold the substrate 201 with the protective film 203 attached thereto in the vertical direction. While installing the substrate 201, the operator first makes the substrate 201 with the protective film 203 pass through the first guide roller 137 and the second guide roller 138, and makes the first guide roller 137 support the substrate 201. The protective film 203 is then peeled off in front of the first guide roller 137 and the second guide roller 138, and the protective film 203 is pulled backward along the circumference of the second guide roller 138 and then pulled onto the rotary shaft 133. By providing the first guide roller 137 and the second guide roller 138, the peeled protective film 203 can be guided to the rotary shaft 133 more reliably and accurately.

In addition, in order to keep more protective films 203, the guide roller unit 136 may also include a third guide roller 139. The third guide roller 139 is provided in the rear-top direction of the first guide roller 137 and the second guide roller 138 to guide the peeled protective films 203. Specifically, the third guide roller 139 is disposed behind the second guide roller 138 in the front-rear direction and above the second guide roller 138 in the vertical direction. In addition, the third guide roller 139 is also disposed in the front of the rotary shaft 133 in the front-rear direction, and disposed below the rotary shaft 133 in the vertical direction. After the protective film 203 is peeled off in front of the second guide roller 138, the peeled protective film 203 is pulled to the rotary shaft 133 along the second guide roller 138 and the third guide roller 139. More protective films 203 can be kept because the protective film 203 is elevated relative to the substrate 201 during the guiding process.

Alternatively, to avoid instability of the protective film 203, the guide roller unit 136 may also include a fourth guide roller 140. The fourth guide roller 140 is disposed in front-bottom direction of the rotary shaft 133, to guide the protective film 203 guided by the third guide roller 139 to the rotary shaft 133.

Referring to FIGS. 3 and 5, in some embodiments, in order to detect the number (caching amount) of the peeled protective film 203, the printer may further include a detecting mechanism 141. The detecting mechanism 141 is provided to detect the number of the protective film 203 that has been peeled from the surface of the substrate 201 to be stored on the rotary shaft 133. For example, the detecting mechanism 141 may be provided between the third guide roller 139 and the fourth guide roller 140, and detect the number of the protective films 203 between the third guide roller 139 and the fourth guide roller 140. In this embodiment, the detecting mechanism 141 may include a detector 142, such as a photoelectric sensor, or a proximity switch.

The stepper motor 135 of the first driving member 132 drives the rotary shaft 133 to rotate while the detector 142 detects the protective film 203. Specifically, when the detector 142 detects that the number of the cached protective films 203 reaches a predetermined amount, the stepper motor 135 of the first driving member 132 rotates by a predetermined number of revolutions, so that the cached protective films 203 are wound on the rotary shaft 133. By using the detecting mechanism 141 in conjunction with the stepper motor 135 to collect the protective films 203 in this manner, a specialized and expensive torque motor is replaced to greatly reduce the cost of the printer. In particular, the printer in this disclosure can be used for an individual user. By reducing the cost of the printer, it is possible to reduce the price when it is used for an individual consumer. It should be noted, of course, that the first driving member 132 may also select a servomotor or a torque motor as an actuating element without considering the cost.

In order to guide the protective film 203 more accurately and to improve the detection of the number of the peeled protective film 203 by the detector 142, the detecting mechanism 141 may further includes a pressing member 143. The pressing member 143 is configured to abut against the protective film 203 peeled from the surface of the substrate 201 to be stored to the rotary shaft 133 from above, and apply a force to the protective film 203 downward. Moreover, the pressing member 143 presses the protective film 203 downward with an increase of the number of the protective films 203 peeled off. The detector 142 is then configured to detect the protective films 203 pressed downward by the pressing member 143. In this embodiment, the pressing member 143 is provided between the third guide roller 139 and the fourth guide roller 140 in the front-rear direction. The protective film 203 that is peeled off from the surface of the substrate 201 passes the third guide roller 139, and presses against and passes the pressing member 143 from underneath the pressing member 143 to extend toward the fourth guide roller 140. Since the pressing member 143 always maintains a downward force applied to the protective film 203, the pressing member 143 continuously presses the protective film 203 downward as the peeling number of the protective films 203 increases. As a result, the pressing member 143 can ensure that the protective films 203 does not wobble, thereby guiding the protective films 203 more accurately. In the case where the protective films 203 are pressed into the detection region of the detector 142, the protective films 203 are detected by the detector 142, at this time, the stepper motor 135 of the first driving member 132 is operated to start to collect the protective films 203.

In some embodiments, the pressing member 143 may be a pressure roller movable in the vertical direction. The pressure roller is supported on the protective films 203 that have been peeled from the surface of the substrate 201 to be stored on the rotary shaft 133. In an embodiment, the guide frames 144 guided along the vertical direction are respectively mounted in the left and right sides of the printing region 110 of the base 109. The two ends of the pressure roller in the axial direction of the pressure roller are guided by the guide frames 144 to slide freely in the vertical direction. The pressure roller is supported on the protective films 203 and gradually presses the protective films 203 downward as the peeling number of the protective films 203 increases and making the protective films 203 being detected by the detector 142. In the case where the stepper motor 135 drives the rotary shaft 133 to rotate to collect the protective films 203, the protective films 203 then lift the pressure roller upward.

Although the pressure roller is used as an example of the pressing member 143, it is not limited thereto. In other embodiments, an elastic member such as a spring may also be used as the pressing member 143.

As a result, the printer in the above embodiments can automatically peel off the protective film 203 from the surface of the substrate 201 at least to a certain extent, thereby reducing the workload of the operator and improving work efficiency.

In addition, by using a combination of the detector 142 and the stepper motor 135, the cost of the printer can be reduced.

Further, by using the pressing member 143, it is possible to improve the detection of the peeling amount of the protective films 203 by the detector 142.

Referring to FIGS. 2, 3, and 6, the carrying mechanism 103 is provided in front of the printing platform 104. The carrying mechanism 103 includes a first clamping roller 106 and a second clamping roller 107 opposite to each other. At least one of the first clamping roller 106 and the second clamping roller 107 is driven by the drive device 108 to rotate. Moreover, the first clamping roller 106 and the second clamping roller 107 are configured to hold the transfer film 202 transferred from the third holding mechanism 102 and the substrate 201 on which the crystal label is printed, so that while the transfer film 202 and the substrate 201 are continuously fed in a forward direction, the transfer film 202 is attached to the printed surface (i.e., the surface on which the crystal label is held, which is the upper surface in the accompanying drawings) of the substrate 201.

The carrying mechanism 103 includes the first clamping roller 106 and the second clamping roller 107 that are opposite to each other, and at least one of the first clamping roller 106 and the second clamping roller 107 is rotated by the drive device 108. Furthermore, the first clamping roller 106 and the second clamping roller 107 hold the transfer film 202 and the substrate 201. Thus, the first clamping roller 106 and the second nipping roller 107 can continuously carry and transfer a crystal label product while adhering the transfer film 202 to the surface of the substrate 201 on which the crystal label is retained.

The second clamping roller 107 is provided above the first clamping roller 106. The two axial ends of the first clamping roller 106 are rotatably disposed on the left and right sides of the printing region 110 of the base 109, respectively. The first clamping roller 106 is driven by a well-known drive device 108, such as a motor. The two axial ends of the second clamping roller 107 are also rotatably disposed on the left and right sides of the printing region 110 of the base 109, respectively. In addition, the two axial ends of the second clamping roller 107 may be directly provided on the left and right sides of the printing region 110 of the base 109 or disposed on the left and right sides of the printing region 110 of the base 109 by means of the switching mechanism in a manner that can approach or be away from the first clamping roller 106. In an embodiment, the switching mechanism is the main switching portion 118 and the auxiliary switching portion 123 described hereinafter.

In addition, if desired, the second clamping roller 107 may also be connected to other well-known driving devices, such as a motor. As a result, in the case where the first clamping roller 106 and the second clamping roller 107 clamp the substrate 201, the substrate 201 such as a release material can be smoothly and continuously fed forward. In the clamping state, the outer peripheral surface of the first nipping roller 106 and the outer peripheral surface of the second nipping roller 107 can abut against each other. As a result, the first clamping roller 106 and the second clamping roller 107 can reliably clamp the transfer film 202 and the substrate 201. In addition, the outer peripheral surface of the first clamping roller 106 and the outer peripheral surface of the second clamping roller 107 can be wrapped with an elastic layer, such as a silica gel or a rubber, respectively, so that the elastic layer on the outer peripheral surface of the first clamping roller 106 and the elastic layer on the outer peripheral surface of the second clamping roller 107 squeeze each other in the clamping state. As a result, the first clamping roller 106 and the second clamping roller 107 can clamp the transfer film 202 and the substrate 201 more reliably.

Referring to FIGS. 2, 3, and 6, the third holding mechanism 102 is disposed in front of the printing platform 104 along the feeding direction of the substrate 201. The transfer film 202 may be a commercially available transfer film 202 stored by winding on a hollow core. The transfer film 202 may be an adapter film known to those skilled in the art. The transfer film 202 is supported in front of the printing platform 104 by the second support shaft 105.

In order to easily replenish the transfer film 202, the third holding mechanism 102 may also include a third bracket 113. The second support shaft 105 is detachably supported on the third bracket 113. In an embodiment, the number of the third bracket 113 may be two. One of the two third brackets 113 is mounted on the left side of the front of the printing region 110 of the base 109, and the other of the two third brackets 113 is mounted on the right side of the front of the printing region 110. The two axial ends of the second support shaft 105 are supported on the two third brackets 113 on the left and right sides, respectively. When the transfer film 202 needs to be replenished, the second support shaft 105 can be directly removed from the third brackets 113, and the core of the transfer film 202 can be withdrawn, and then the core of the new transfer film 202 is inserted into the second support shaft 105 to complete the replenishment of the transfer film 202.

The third holding mechanism 102 is provided in front of the carrying mechanism 103. The fifth guide roller 114 is provided between the third holding mechanism 102 and the carrying mechanism 103 for guiding the transfer film 202 to an opposing position of the first clamping roller 106 and the second clamping roller 107. Specifically, the third holding mechanism 102 is provided in front of the carrying mechanism 103 and located above the base 109 with respect to the carrying mechanism 103, so that the sufficient space for storing the transfer film 202 in the rolled form can be reserved between the third holding mechanism 102 and the carrying mechanism 103. The fifth guide roller 114 is provided between the third holding mechanism 102 and the carrying mechanism 103 in the vertical direction and in the front-rear direction. The two axial ends of the fifth guide roller 114 can be provided on the left and right sides of the printing region 110 of the base 109 as in the case of the first clamping roller 106. As a result, one end of the transfer film 202 in the rolled form can be easily guided to the opposing position (clamping position) of the first clamping roller 106 and the second clamping roller 107. The transfer film 202 is folded back after crossing the first clamping roller 106 and the second clamping roller 107 in a front-rear direction from above the first clamping roller 106 and the second clamping roller 107. Then the transfer film 202 passes between the first clamping roller 106 and the second clamping roller 107 in the front direction, so that it is clamped together with the substrate 201 by the first clamping roller 106 and the second clamping roller 107. As a result, the transfer film 202 and the substrate 201 are attached and transferred forwards while the drive device 108 drives the first clamping roller 106 to rotate.

Referring to FIGS. 7 and 8, to replenish the substrate 201 and/or the transfer film 202, the printer may also include the main switching portion 118. The main switching portion 118 is connected to the second clamping roller 107, thereby allowing the second clamping roller 107 to approach or be away from the first clamping roller 106. For example, when the main switching portion 118 is switched in such a way as to bring the second clamping roller 107 close to the first clamping roller 106, the outer peripheral surfaces of the first clamping roller 106 and the second clamping roller 107 abuts against each other, and the first clamping roller 106 and the second clamping roller 107 are in the clamping state. In the clamping state, the substrate 201 and the transfer film 202 are clamped by the first clamping roller 106 and the second clamping roller 107. When the main switching portion 118 is switched in such a way that the second clamping roller 107 is moved away from the first clamping roller 106, the first clamping roller 106 and the second clamping roller 107 are separated from each other, so that the substrate 201 and/or the transfer film 202 can be easily moved through the position (the opposed position) between the first clamping roller 106 and the second clamping roller 107 or be withdrawn from the opposed position.

In some embodiments, in order to switch the second clamping roller 107 easily, the main switching portion 118 may include a first lever member 119 and a handle 120. One end of the first lever member 119 is connected to one axial end of the second clamping roller 107. The handle 120 is configured to swingably abut against the other end of the first lever member 119. Specifically, the first lever member 119 may be made of sheet metal. The middle of the first lever member 119 in the length direction is swingably supported against the base 109 by a pin (not shown in drawings). One axial end of the second clamping roller 107 is rotatably connected to the end of the first lever member 119. The handle 120 is also configured to swingably support on the base 109 by the pin (not shown in drawings). One end of the handle 120 is provided with a cam portion 121. The cam portion 121 of the handle 120 abuts against the other end of the first lever member 119. In addition, the other end of the handle 120 is provided with a shank portion 122 which is exposed outside the base 109. As a result, when the operator holds and swings the shank portion 122 counterclockwise, the cam portion 121 of the handle 120 pushes the first lever member 119 to swing counterclockwise, thereby lifting up the second clamping roller 107 supported at one end (rear end in the accompanying drawings) of the first lever member 119, and moving the second clamping roller 107 away relative to the first clamping roller 106. When the operator holds and swings the shank portion 122 clockwise, the cam portion 121 of the handle 120 is lifted relative to the other end (front end in the accompanying drawings) of the first lever member 119, thereby causing the first lever member 119 to swing clockwise. Thus, the second clamping roller 107, which is supported at the rear end of the first lever member 119, descends and abuts against the first clamping roller 106, thereby switching to the clamping state.

Referring to FIG. 5, to switch the position of the second clamping roller 107 in a more balanced manner, the printer may further include an auxiliary switching portion 123. The auxiliary switching portion 123 includes a second lever member 124 and a cam member 125. An end of the second lever member 124 is connected to the other axial end of the second clamping roller 107. The cam member 125 is configured to swingably abut against the other end of the second lever member 124. Specifically, the main switching portion 118 is provided on the right side of the printing region 110 of the base 109. The auxiliary switching portion 123 is provided on the left side of the printing region 110 of the base 109. The handle 120 of the main switching portion 118 may be connected to the cam member 125 of the auxiliary switching portion 123 by a linkage shaft 126. The structure of the second lever member 124 is configured with reference to the first lever member 119, and the structure of the cam member 125 is configured with reference to the cam portion 121 of the handle 120. As a result, when the operator operates the handle 120 of the main switching portion 118, the cam member 125 of the auxiliary switching portion 123 and the cam portion 121 of the main switching portion 118 swing in the same trajectory, thereby driving the second lever member 124. As a result, by providing the auxiliary switching portion 123, both axial ends of the second clamping roller 107 can simultaneously lift or fall, thereby switching the second clamping roller 107 more smoothly.

Referring to FIGS. 6 and 3 again, the second clamping roller 107 may be provided with an accommodating hole 127 extending in the axial direction of the second clamping roller 107. The accommodating hole 127 is configured to accommodate a heating member 128. The accommodating hole 127 may be passable along the axial direction of the second clamping roller 107. In an embodiment, the heating member 128 may be selected from well-known heating rods or thermocouples. The heating member 128 is provided in the second clamping roller 107, thereby increasing the temperature of the outer periphery of the second clamping roller 107. As a result, the transfer film 202 pressed by the second clamping roller 107 can be heated so that the transfer film 202 is more tightly attached to the substrate 201, and so that the crystal labels held on the substrate 201 are firmly attached to the transfer film 202. As a result, the crystal label can be removed from the substrate 201 easily and attached to the transfer film 202 more reliably.

In addition, to accurately control the temperature of the outer periphery of the second clamping roller 107, the printer may also include a temperature sensor 129 for detecting the temperature of the outer periphery of the second clamping roller 107. The temperature sensor 129 may be selected from well-known non-contact temperature sensors, such as infrared rays. To detect the temperature of the outer periphery of the second clamping roller 107 more accurately, the number of the temperature sensor 129 is two or more. One of the two temperature sensors 129 is provided on one side of the axial direction of the second clamping roller 107, and the other of the two temperature sensors 129 is provided on the other side of the axial direction of the second clamping roller 107.

Further, when the main switching portion 118 and the auxiliary switching portion 123 are provided, the temperature sensor 129 may be connected to the main switching portion 118. In this embodiment, a mounting bracket 130 may be provided in front of the second clamping roller 107. The ends of the mounting bracket 130 in length direction are mounted on the first lever member 119 of the main switching portion 118 and the second lever member 124 of the auxiliary switching portion 123, respectively. The temperature sensor 129 is mounted on the mounting bracket 130 and opposite the second clamping roller 107. As a result, the temperature sensor 129 can be maintained at a position where the temperature of the outer circumference of the second clamping roller 107 can be always detected.

Each of the technical features described in the above embodiments can be combined with each other in the case of no contradiction. For the sake of unnecessary repetition, the various possible combinations are not separately described.

Accordingly, the embodiments above are merely illustrative, and are not intended to limit the scope of the disclosure. It should be understood that any modifications and replacements made by those skilled in the art without departing from the spirit of the disclosure should fall within the scope of the disclosure defined by the appended claims.

What is claimed is:

1. A roll-to-roll printer, comprising:
a first holding mechanism;
a second holding mechanism;
a printing mechanism;
a third holding mechanism; and
a carrying mechanism;
wherein the first holding mechanism is configured to rotatably support a substrate stored in a rolled form;
the second holding mechanism is provided above the first holding mechanism, and is configured to continuously collect a protective film which is peeled off from a surface of the substrate;
the printing mechanism is provided in front of the first holding mechanism; the printing mechanism is provided with a printing platform; the printing platform is configured to hold the substrate with the protective film peeled off; and the substrate is configured to be continuously supported on the first holding mechanism in the rolled form, and continuously transferred across the printing platform from the first holding mechanism toward a front of the printing platform;
the third holding mechanism is provided in front of the printing platform, and is configured to rotatably support a transfer film stored in a rolled form;
the carrying mechanism is provided in front of the printing platform, and is configured to attach the transfer film to a printed surface of the substrate to continuously carry the transfer film and the substrate;
the carrying mechanism is provided with a first clamping roller and a second clamping roller opposite to each other; at least one of the first clamping roller and the second clamping roller is configured to be driven by a drive device to rotate; and the first clamping roller and the second clamping roller are configured to hold the transfer film transferred from the third holding mechanism and a printed substrate; and
the second clamping roller is provided with an accommodating hole extending in an axial direction of the second clamping roller; and the accommodating hole is configured to accommodate a heating member.

2. The roll-to-roll printer of claim 1, further comprising:
a main switching portion;
wherein the main switching portion is connected to the second clamping roller to allow the second clamping roller to approach or be away from the first clamping roller.

3. The roll-to-roll printer of claim 2, wherein the main switching portion comprises a first lever member and a handle; and
a first end of the first lever member is connected to a first axial end of the second clamping roller; and the handle is configured to swingably abut against a second end of the first lever member.

4. The roll-to-roll printer of claim 3, further comprising:
an auxiliary switching portion;

wherein the auxiliary switching portion comprises a second lever member and a cam member;

a first end of the second lever member is connected to a second axial end of the second clamping roller;

the cam member is configured to swingably abut against a second end of the second lever member; and the handle is connected to the cam member through a linkage shaft.

5. The roll-to-roll printer of claim 1, further comprising: a temperature sensor;

wherein the temperature sensor is configured for detecting an outer peripheral temperature of the second clamping roller.

6. The roll-to-roll printer of claim 5, wherein a mounting bracket is provided in front of the second clamping roller, two ends of the mounting bracket along a length direction are mounted on the first lever member and the second lever member, respectively; and the temperature sensor is mounted on the mounting bracket and opposite the second clamping roller.

7. The roll-to-roll printer of claim 1, wherein the second holding mechanism comprises a driving member and a rotary shaft; the driving member is connected to the rotary shaft to drive the rotary shaft to rotate so that the protective film peeled off from the surface of the substrate is wound on the rotary shaft.

8. The roll-to-roll printer of claim 7, further comprising: a guide roller unit;

wherein the guide roller unit is configured to guide the protective film peeled off from the surface of the substrate to the rotary shaft;

the guide roller unit comprises a first guide roller and a second guide roller opposite to each other in a vertical direction; and the first guide roller and the second guide roller are provided between the first holding mechanism and the printing mechanism in a front-rear direction;

the substrate with the protective film attached thereto is configured to pass between the first guide roller and the second guide roller; and the protective film is configured to be peeled off from the surface of the substrate in front of the first guide roller and the second guide roller.

9. The roll-to-roll printer of claim 7, further comprising: a detecting mechanism;

wherein the detecting mechanism is configured for detecting the number of the protective film which is peeled from the surface of the substrate to be stored on the rotary shaft.

10. The roll-to-roll printer of claim 9, wherein the detecting mechanism comprises a pressing member and a detector;

the guide roller unit further comprises a third guide roller and a fourth guide roller;

the third guide roller and the fourth guide roller are sequentially arranged at a downstream side of the second guide roller along a conveying direction of the protective film;

the pressing member and the detector are both provided between the third guide roller and the fourth guide roller;

the pressing member is configured to abut against the protective film peeled from the surface of the substrate to be stored on the rotary shaft from above, and press the protective film downward with an increase of the number of the protective film; and the detector is configured to detect whether the protective film is pressed downward by the pressing member to reach a detection region, if yes, the detector is configured to control the driving member to start to drive the rotary shaft to rotate, so as to wind the protective film on the rotary shaft.

11. The roll-to-roll printer of claim 1, wherein an outer peripheral surface of each of the first clamping roller and the second clamping roller is wrapped with an elastic layer.

* * * * *